(12) United States Patent
Veary

(10) Patent No.: US 10,148,076 B2
(45) Date of Patent: Dec. 4, 2018

(54) HIGH VOLATAGE POWER LINE STRINGING TRAVELER

(71) Applicant: Brian Thomas Veary, Lacombe (CA)

(72) Inventor: Brian Thomas Veary, Lacombe (CA)

(*) Notice: Subject to any disclaimer, the term of this patent is extended or adjusted under 35 U.S.C. 154(b) by 0 days.

(21) Appl. No.: 15/019,554

(22) Filed: Feb. 9, 2016

(65) Prior Publication Data

US 2017/0229847 A1    Aug. 10, 2017

(51) Int. Cl.
*H02G 1/04* (2006.01)
*H02G 7/05* (2006.01)
*H02G 3/30* (2006.01)

(52) U.S. Cl.
CPC ............... *H02G 7/05* (2013.01); *H02G 3/24* (2013.01)

(58) Field of Classification Search
CPC ........... H02G 1/04; B65H 57/06; B65H 57/14
USPC ................................ 254/134.3 PA, 3 CL, 3 R
See application file for complete search history.

(56) References Cited

U.S. PATENT DOCUMENTS

| | | | |
|---|---|---|---|
| 1,503,713 A * | 8/1924 | Sanders | B65H 57/00 242/157 R |
| 2,188,715 A * | 1/1940 | Ingram | H02G 1/04 254/134.3 PA |
| 2,590,645 A * | 3/1952 | Petersen | H02G 1/04 248/55 |
| 2,946,559 A * | 7/1960 | Pickett | B65H 57/14 254/134.3 PA |
| 3,199,840 A | 8/1965 | Lindsey | |
| 3,739,075 A | 6/1973 | Jean et al. | |
| 3,961,470 A * | 6/1976 | Goerens | D01H 7/604 57/119 |
| 4,134,574 A * | 1/1979 | Jean | H01B 17/22 254/134.3 R |
| 4,160,540 A * | 7/1979 | Lindsey | H02G 1/04 254/134.3 PA |
| 4,178,470 A * | 12/1979 | Jean | H01B 17/22 174/156 |
| 4,247,084 A * | 1/1981 | Lindsey | H02G 1/04 254/134.3 PA |
| 4,875,333 A * | 10/1989 | Nakano | D01H 7/604 57/125 |
| 4,907,782 A * | 3/1990 | Hoekstra | H02G 1/04 248/218.4 |
| D369,092 S * | 4/1996 | Sauber | D8/356 |
| 5,533,710 A * | 7/1996 | Sauber | H02G 1/04 254/134.3 PA |
| 5,599,005 A | 2/1997 | Sauber | |
| 5,837,943 A * | 11/1998 | Kellett | H01B 17/16 174/169 |
| 6,315,269 B1 * | 11/2001 | Fleury | B66D 3/046 254/134.3 PA |
| 2015/0249325 A1 * | 9/2015 | O'Connell et al. | H02G 1/04 254/134.3 R |

* cited by examiner

*Primary Examiner* — George Nguyen
(74) *Attorney, Agent, or Firm* — Richard D. Okimaw

(57) ABSTRACT

A traveler for electrical power lines, comprising: a) a body portion comprising rubber, plastic or a combination thereof; and b) an insulator clamping portion.

19 Claims, 4 Drawing Sheets

US 10,148,076 B2

HIGH VOLATAGE POWER LINE STRINGING TRAVELER

FIELD OF THE INVENTION

The present disclosure is in the field of electrical power line stringing traveler devices and methods of use.

BACKGROUND OF THE DISCLOSURE

Electrical demand in the United States and worldwide has grown exponentially along with the increases in population. To meet the electrical needs of the population increase, the utilities constantly upgrade systems in the power grid to add new power lines and/or to replace existing power lines with new power lines which may be able to carry more current. Power line stringing devices and methods are used between utility towers or electrical poles which may be separated by a varying distance.

During the power line stringing operation, a device called a traveler is used to string the power line. The insulator affixed to a pin on a utility tower or pole is removed and a traveler is affixed to the same pin. Then, the stringing of the power line is accomplished via the pin mounted traveler. After the stringing of the power line is complete the traveler is removed from the pin and replaced with the insulator. Alternatively, during the power line stringing operation, a insulator bracket is affixed to the insulator and a stringing block is affixed to the insulator bracket. Then, the stringing of the power line is accomplished via the stringing block affixed to the insulator bracket. After the stringing of the power line is complete the stringing block is removed from the insulator bracket and the insulator bracket is subsequently removed from the insulator. These two operations are widely used but are cumbersome due to the weight of the aluminum travelers and brackets and the amount of equipment required. Moreover, the number of steps of removing insulators and/or installing brackets and subsequently installing a stringing block.

Therefore, there is need for a lightweight stringing traveler device capable of being mounted directly to an insulator and a stringing method with the same traveler device that is more efficient and safer than current practices.

SUMMARY OF THE INVENTION

A traveler for electrical power lines, comprising: a) a body portion comprising rubber, plastic or a combination thereof; and b) an insulator clamping portion.

A method of stringing power lines with one or more travelers comprising the steps of: a) providing a plurality of insulators of electrical poles of a distribution or transmission line, each of which comprises a portion which includes an insulator clamping surface; b) providing a plurality of travelers for electrical power lines, comprising: i. a body portion comprising rubber, plastic or a combination thereof; and ii. an insulator clamping portion; c) removing the power line from each insulator; d) mounting each traveler to each of a plurality of insulators on a series of electrical poles of a distribution or transmission line; e) inserting a power line into each traveler, whereby the power line rests on the slideable saddle surface portion and is secured via the latch portion; f) pulling a power line along the slideable saddle surface portion of the plurality of travelers; g) tensioning the power line from each traveler to bring to provide a desired amount of sag between the electrical poles; h) removing the power line from the plurality of travelers; i) removing the plurality of travelers from the plurality of insulators on the series of electrical poles of the distribution or transmission line; j) removing the power line from the plurality of travelers; and k) remounting the power line on the insulator.

DETAILED DESCRIPTION OF THE EMBODIMENTS

The following is a detailed description of certain specific embodiments of the power line stringing traveler devices and methods disclosed herein. In this description reference is made to the drawings.

Introduction

In one aspect, disclosed herein is a traveler for electrical power lines, comprising: a) a body portion, comprising: i. a saddle portion, ii. a left side portion and a right side portion, and iii. an insulator mounting portion, wherein the body portion is rubber, plastic or a combination thereof; b) a latch portion; c) an insulator clamping portion; and d) a slideable saddle surface portion, wherein the traveler is capable of being affixed to an insulator, and wherein the body portion is rubber.

Figure 1:
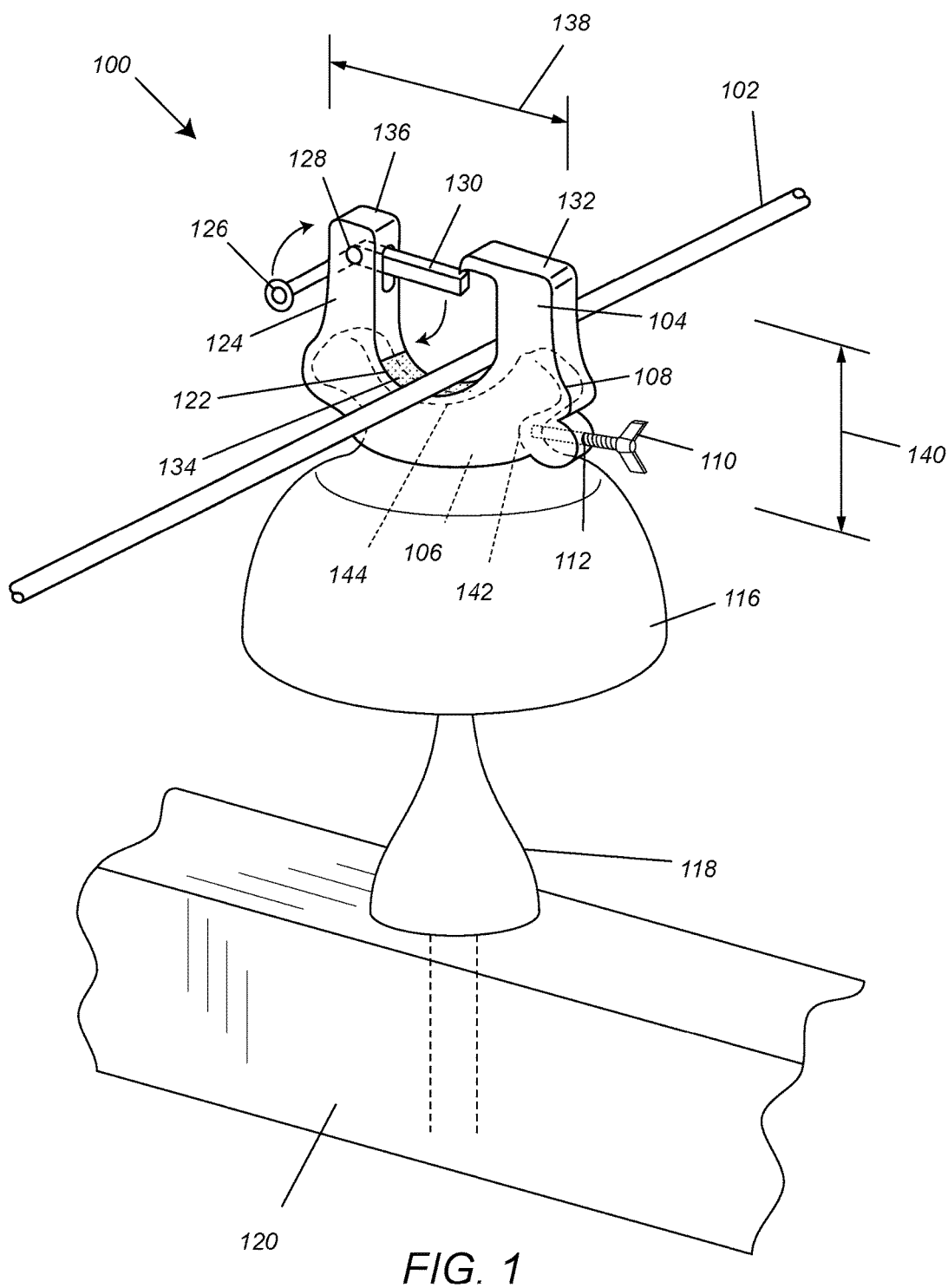
FIG. 1 is an illustration of a power line stringing traveler device 100, comprising a one way lever 130, a puck board saddle portion 134 and a bolt or a wing nut 110.

Referring to the drawings, FIGS. 1 is an illustration of a power line stringing traveler device 100, comprising a one way lever 130, a left side wall portion 124 and a right sidewall portion 104, a puck board saddle portion 134 and a bolt or a wing nut 110. During a stringing operation the power line 102 slideably engaged atop the saddle portion 122, which comprises a low friction puck board saddle portion 134. The slideable saddle surface portion is a surface that provides a minimum amount of friction while the power line 102 is being strung alone each traveler. In some embodiments, the slideable saddle surface portion comprises a puck board saddle portion 134. The stringing traveler device 100 is comprised of rubber and is capable of securely fitting around an insulator clamping surface 106 of an insulator 116, whereby the insulator 116 is affixed to a pin 118 of a horizontal cross arm 120. In some embodiments, the insulator mounting portion is sized to fit around an insulator clamping surface 106 of an insulator 116. The insulator clamping surface 106 is provided by the neck 142 and groove 116 portion of an insulator as used in the utility industry. In some embodiments, the insulator mounting portion 108 is sized to fit around an insulator clamping surface 106 of an insulator and the insulator mounting portion 108 is flexible and capable of flexing to fit around the insulator clamping surface 106 of the insulator. In some embodiments, the insulator clamping portion comprises a bolt or a wing nut 110. In some embodiments, the bolt or wing nut 110 are threaded through a threaded sleeve or nut 112, whereby a bolt's or a wing nut's terminal end 114 applies pressure to the neck portion 142 of the insulator 116, thereby securing the stringing traveler device 100 to the insulator 116.

The design of a stringing traveler device 100 is intended to provide a compact and lightweight traveler without the operator having to carry and manipulate heavy and cumbersome insulator brackets that must be affixed to the insulator along with a stringing block as used in the industry. In this aspect, the stringing traveler device 100 has a diameter of between about 3 inches to 12 inches and a height 140 of between about 2 inches and 10 inches. Moreover the saddle portion has a width of between about 1 inch to 2.5 inches and a top opening between the top portions 136 and 132 of between about 1 inch to 4 inches. In some embodiments, the stringing traveler device 100 has a diameter of between about 6 inches to about 8 inches. In some embodiments, the stringing traveler device 100 has a height 140 of between about 4 inches and 6 inches. In some embodiments, the saddle portion has a width of about 2 inches and a top opening between top portions 136 and 132 of between about 2 inches to 3 inches.

During operation of the stringing traveler device 100, the one-way lever 130 is actuated to insert the power line 102 into the traveler whereby the power wire rests on the saddle portion 122, which comprises a slideable puck board saddle portion 134 for low friction slideable stringing movement of the power wire 102. In some embodiments, the one-way lever 130 is held in a closed position via a spring loaded pin 128 and the one-way lever 130 is placed in an open position with a thumb lever portion 126. In some embodiments, the latch portion is affixed to a top portion of the left side portion and the right side portion of the body. In some embodiments, wherein the latch portion is affixed to a top portion of the left side portion and the right side portion of the body and the latch portion comprises a one-way lever.

Figure 2:
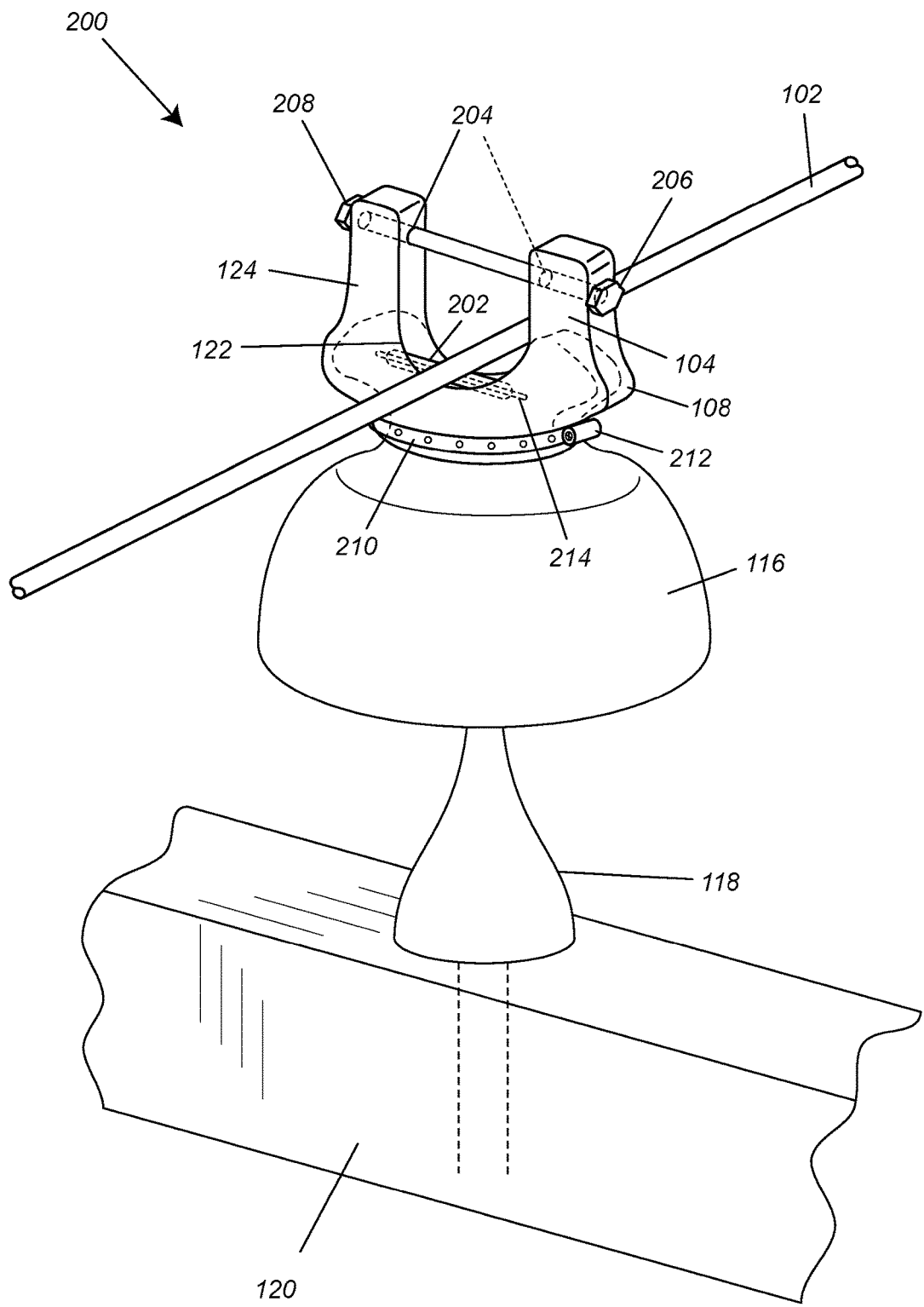
FIG. 2 is an illustration of a power line stringing traveler device 200, comprising a bolt 206 and 208 nut, a saddle roller portion 202 and a clamp 210.

Referring to the drawings, FIG. 2 is an illustration of a power line stringing traveler device 200, comprising a bolt 206 and 208 nut, a saddle roller portion 202 and a clamp 210. In some embodiments, the slideable saddle surface portion comprises a saddle roller portion 202. In some embodiments, the saddle roller portion is comprised of aluminum, plastic or a combination thereof. The saddle roller portion 202 is rotateably engaged with axle portion 214. The power line stringing traveler device 200 has a latch portion comprising a bolt 206 and 208 nut threaded through openings 204 in the top left side portion 136 and the top right side portion 132. The insulator mounting portion 108 is sized to fit around an insulator clamping surface 106 of an insulator and the insulator mounting portion is flexible and capable of flexing to fit around the insulator clamping surface 106 of the insulator. In some embodiments, the insulator mounting portion 108 comprises a clamp 210. In some embodiments, the clamp 210 comprises a clamp tightening mechanism 212 which tightens the clamp 210 and applies pressure to the neck portion 142 of the insulator 116, thereby securing the stringing traveler device 200 to the insulator 116. In some embodiments, the clamp tightening mechanism 212 comprises a screw head and screw engaged with the clamp 210.

Figure 3:
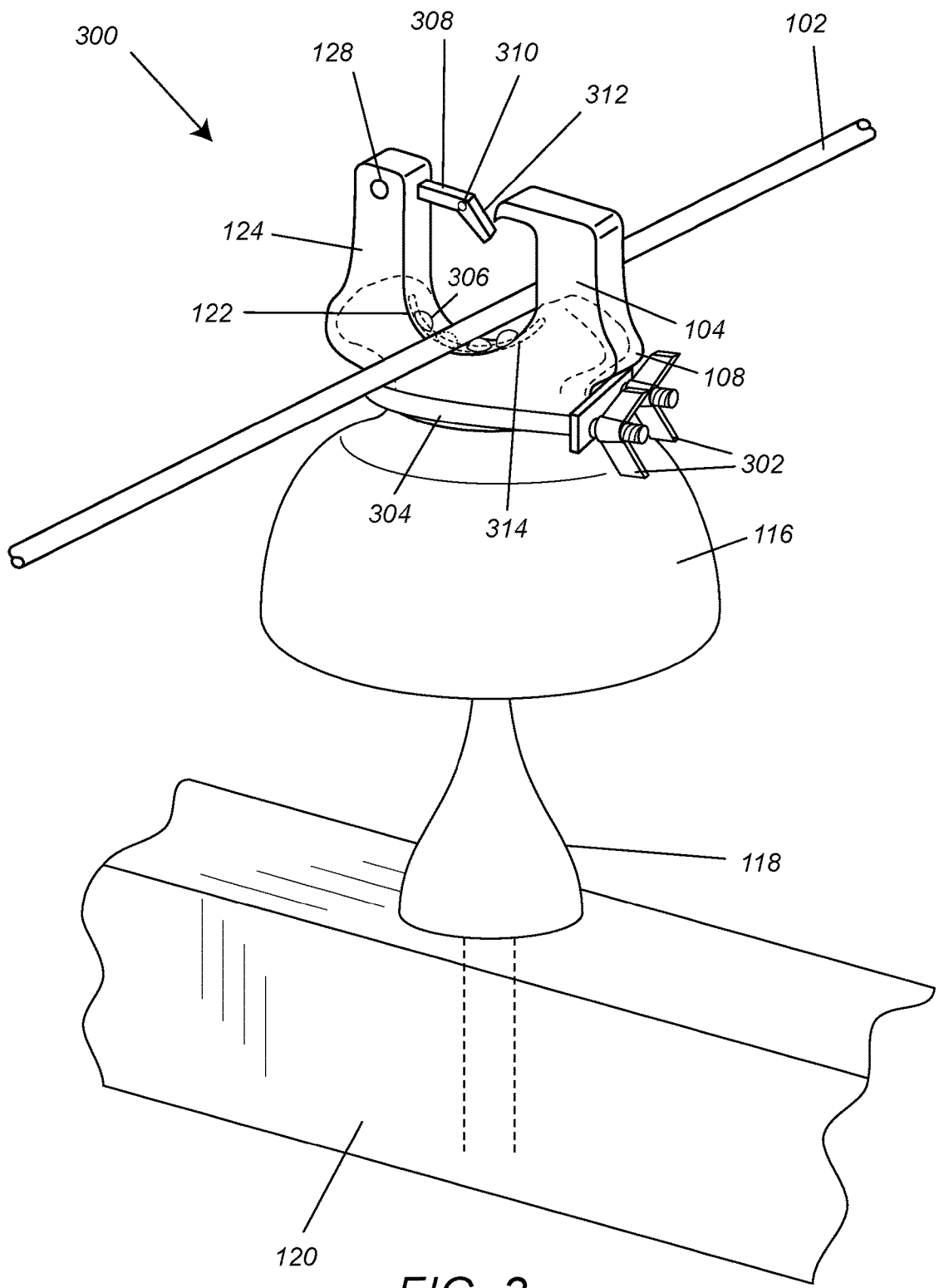
FIG. 3 is an illustration of a power line stringing traveler device 300, comprising a pin 308 and one way lever 312, a saddle bearing portion 306 and a U-bolt 304.
Figures 4A, 4B, 4C, 4D:
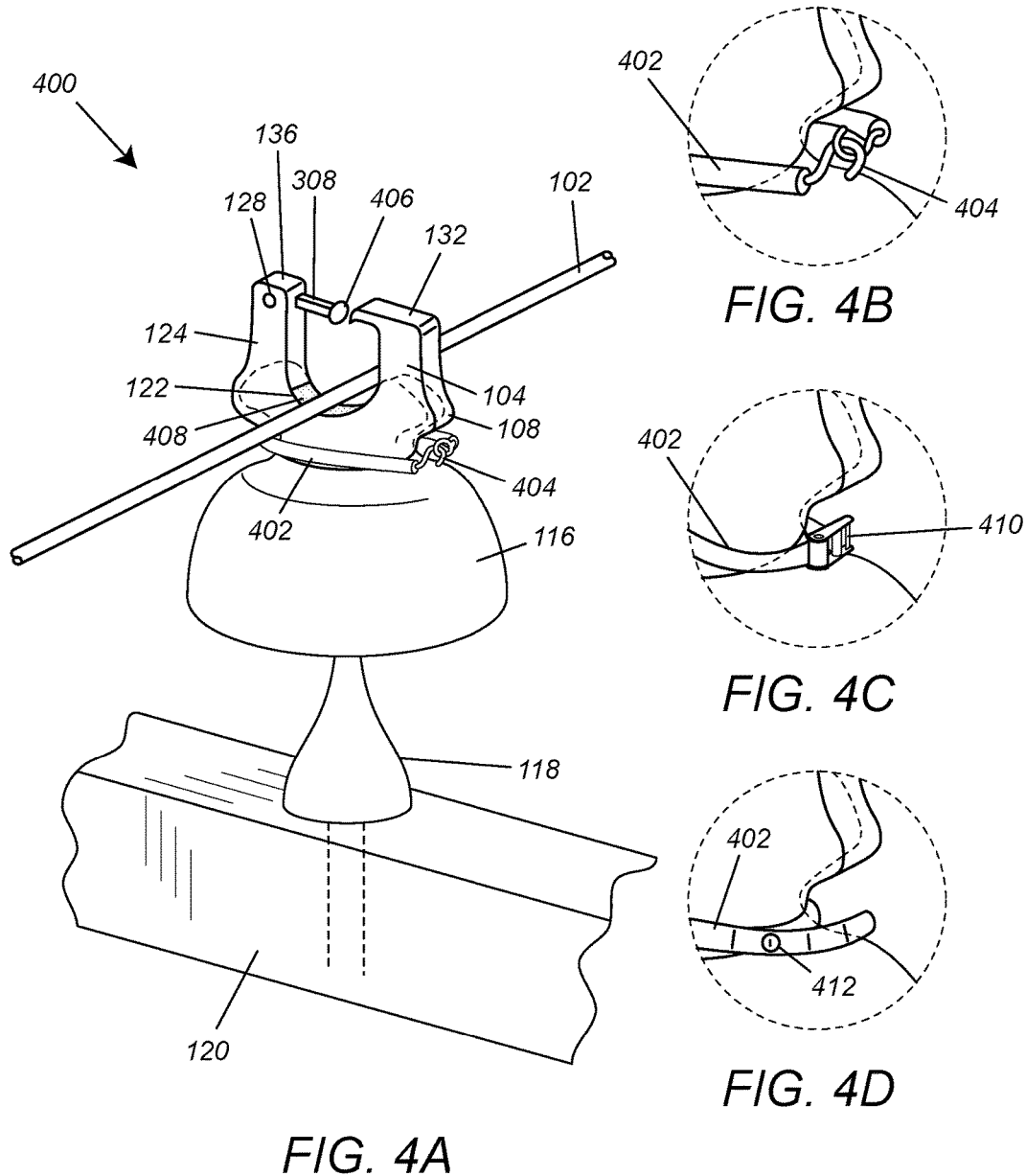
FIG. 4A is an illustration of a power line stringing traveler device 400, comprising a pin 308 and a roller 406, a plastic saddle portion 408 and a strap 402.
FIG. 4B is an illustration of a power line stringing traveler device 400, comprising a pin 308 and a roller 406, a plastic saddle portion 408 and hooks 404.
FIG. 4C is an illustration of a power line stringing traveler device 400, comprising a pin 308 and a roller 406, a plastic saddle portion 408 and a tie down ratchet 410.
FIG. 4D is an illustration of a power line stringing traveler device 400, comprising a pin 308 and a roller 406, a plastic saddle portion 408 and a plurality of buttons 412.

Referring to the drawings, FIG. 3 is an illustration of a power line stringing traveler device 300, comprising a pin 308 and one way lever 312, saddle bearing portion 306 and a U-bolt 304. In some embodiments, the slideable saddle surface portion comprises one or more saddle bearings 306. The one or more saddle bearings 306 are rotateably engaged with an axle portion 314. In some embodiments, the saddle bearings are comprised of aluminum, plastic or a combination thereof. The power line stringing traveler device 300 has a latch portion comprising a pin 308 and one way lever 312 at the top left side portion 136 and the top right side portion 132, whereby the one way lever 312 is affixed with a pin 128. The insulator mounting portion 108 is sized to fit around an insulator clamping surface 106 of an insulator and the insulator mounting portion is flexible and capable of flexing to fit around the insulator clamping surface 106 of the insulator. In some embodiments, the insulator mounting portion 108 comprises a U-bolt 304. In some embodiments, the U-bolt 304 comprises a bolt and nut or a wing nut 302 which tightens the U-bolt 304 and applies pressure to the neck portion 142 of the insulator 116, thereby securing the stringing traveler device 300 to the insulator 116.

Referring to the drawings, FIGS. 4A-4D are illustrations of a power line stringing traveler device 400, comprising a pin 308 and a roller 406, a low friction plastic saddle portion 408 and a strap 402. In some embodiments, the slideable saddle surface portion comprises low friction plastic 408. The power line stringing traveler device 400 has a latch portion comprising a pin 308 and a roller 406 at the top left side portion 136 and the top right side portion 132, whereby the roller 406 allows for the power line 102 to be inserted into the power line stringing traveler device 400. The insulator mounting portion 108 is sized to fit around an insulator clamping surface 106 of an insulator and the insulator mounting portion is flexible and capable of flexing to fit around the insulator clamping surface 106 of the insulator. In some embodiments, the insulator mounting portion 108 comprises a strap 402. In some embodiments, the strap 402 comprises a strap engagement mechanism which tightens the strap 402 and applies pressure to the neck portion 142 of the insulator 116, thereby securing the stringing traveler device 400 to the insulator 116. In some embodiments, the strap 402 is a bungee cord, tie down straps, rubber straps or similar means. In some embodiments, the strap engagement mechanism is a pair of hooks 404, hook and loop, ratcheting tie down mechanism 410, buttons 412 or similar means.

In another aspect is a method of stringing power lines with one or more travelers comprising the steps of: a) providing a plurality of insulators of electrical poles of a distribution or transmission line, each of which comprises a portion which includes an insulator clamping surface; b) providing a plurality of travelers for electrical power lines, comprising: i. a body portion, comprising a saddle portion, a left side portion and a right side portion, and an insulator mounting portion, wherein the body portion is rubber, plastic or a combination thereof, ii. a latch portion, iii. an insulator clamping portion, and iv. a slideable saddle surface portion; b) removing the power line from each insulator; c) mounting each traveler to each of a plurality of insulators on a series of electrical poles of a distribution or transmission line; d) inserting a power line into each traveler, whereby the power line rests on the slideable saddle surface portion and is secured via the latch portion; e) pulling a power line along the slideable saddle surface portion of the plurality of travelers; f) tensioning the power line from each traveler to bring to provide a desired amount of sag between the electrical poles; g) removing the power line from the plurality of travelers; h) removing the plurality of travelers from the plurality of insulators on the series of electrical poles of the distribution or transmission line; i) removing the power line from the plurality of travelers; and j) remounting the power line on the insulator, wherein the method of stringing power lines with one or more travelers wherein the traveler is capable of being affixed to an insulator.

For example, during operation of the stringing traveler device 100, the one-way lever 130 is actuated to insert the power line 102 into the traveler. In one embodiment, the method of stringing power lines with one or more travelers, wherein the latch portion is affixed to an upper portion of the left side portion and the right side portion of the body. In one embodiment, the method of stringing power lines with one or more travelers, wherein the latch portion is affixed to an upper portion of the left side portion and the right side portion of the body and the latch portion comprises a one-way lever, a nut and bolt, a pin and lever or a pin and roller.

The power wire rests on the saddle portion 122, which comprises a slideable puck board saddle portion 134 for low friction slideable movement of the power wire 102. In one embodiment, the method of stringing power lines with one or more travelers, wherein the slideable saddle surface portion comprises low friction plastic, puck board, a roller or one or more bearings.

The stringing traveler device 100 is comprised of rubber and is capable of securely fitting around an insulator clamping surface 106 of an insulator 116. In one embodiment, the method of stringing power lines with one or more travelers, wherein the body portion is rubber. In one embodiment, the method of stringing power lines with one or more travelers, wherein the insulator mounting portion is sized to fit around an insulator clamping surface of an insulator. In one embodiment, the method of stringing power lines with one or more travelers, wherein the insulator mounting portion is sized to fit around an insulator clamping surface of an insulator and the insulator mounting portion is flexible and capable of flexing to fit around the insulator clamping surface of the insulator. In one embodiment, the method of stringing power lines with one or more travelers, wherein the insulator clamping portion comprises a wing nut, a clamp, a U-bolt or a strap.

The stringing traveler device disclosed herein is for use with transmission power lines or distribution power lines where the body portion of the stringing traveler device may be made entirely of a moldable and wear-resistant rubber material. Examples of additional materials may be plastic, nylon, aluminum or combinations thereof.

The stringing method disclosed herein is more economical than the methods on the market today, because it eliminates the necessity for the use of heavy cumbersome stringing roller blocks and the temporary brackets that need to be installed on top of the insulator or the insulator is removed while a stringing device affixed atop the pin and is then removed and the insulator is re-installed. The disclosed stringing traveler device and its methods of use are an improvement over the currently used devices by reducing the amount of equipment needed with the operator on the electrical pole, reduced weight and at the same time the insulator is not removed.

Definitions

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

The presently disclosed power line stringing traveler devices and methods is/are not to be limited in scope by the specific embodiments described herein, which are intended as single illustrations of individual aspects of the presently disclosed devices and methods, and functionally equivalent devices, methods and components are within the scope of the presently disclosed power line stringing traveler devices and methods. Indeed, various modifications of the presently disclosed power line stringing traveler devices and methods, in addition to those shown and described herein will become apparent to those skilled in the art from the foregoing description and accompanying drawings. Such modifications are intended to fall within the scope of the appended claims.

What is claimed is:

1. A traveler for electrical power lines, comprising:
   a) a body portion comprising rubber, plastic or a combination thereof;
   b) an insulator clamping portion;
   c) a latch portion;
   d) an insulator clamping portion; and
   e) a slideable saddle surface portion,
   wherein the body portion, comprises
      i. a saddle portion,
      ii. a left side portion and a right side portion, and
      iii. an insulator mounting portion.

2. The traveler of claim 1, wherein the traveler is capable of being affixed to an insulator.

3. The traveler of claim 1, wherein the body portion is rubber.

4. The traveler of claim 1, wherein the insulator mounting portion is sized to fit around an insulator clamping portion of an insulator.

5. The traveler of claim 1, wherein the insulator mounting portion is sized to fit around an insulator clamping portion of an insulator and the insulator mounting portion is flexible and capable of flexing to fit around the insulator clamping surface of the insulator.

6. The traveler of claim 1, wherein the insulator clamping portion comprises a wing nut, a clamp, a U-bolt or a strap.

7. The traveler of claim 1, wherein the latch portion is affixed to a top portion of the left side portion and the right side portion of the body.

8. The traveler of claim 1, wherein the latch portion is affixed to an upper portion of the left side portion and the right side portion of the body and the latch portion comprises a one-way lever, a nut and bolt, a pin and lever or a pin and roller.

9. The traveler of claim 1, wherein the slideable saddle surface portion comprises low friction plastic, puck board, a roller or one or more bearings.

10. A method of stringing power lines with one or more travelers comprising the steps of:
  a) providing a plurality of insulators of electrical poles of a distribution or transmission line, each of which comprises a portion which includes an insulator clamping surface;
  b) providing a plurality of travelers for electrical power lines, comprising:
    i. a body portion comprising rubber, plastic or a combination thereof,
    ii. an insulator clamping portion;
    iii. a latch portion; and
    iv. a slideable saddle surface portion,
  c) removing the power line from each insulator;
  d) mounting each traveler to each of a plurality of insulators on a series of electrical poles of a distribution or transmission line;
  e) inserting a power line into each traveler, whereby the power line rests on the slideable saddle surface portion and is secured via the latch portion;
  f) pulling a power line along the slideable saddle surface portion of the plurality of travelers;
  g) tensioning the power line from each traveler to bring to provide a desired amount of sag between the electrical poles;
  h) removing the power line from the plurality of travelers;
  i) removing the plurality of travelers from the plurality of insulators on the series of electrical poles of the distribution or transmission line;
  j) removing the power line from the plurality of travelers; and
  k) remounting the power line on the insulator.

11. The method of claim 10, wherein the traveler further comprises:
  a) a latch portion;
  b) an insulator clamping portion; and
  c) a slideable saddle surface portion,
  wherein the body portion, comprises
    i. a saddle portion,
    ii. a left side portion and a right side portion, and
    iii. an insulator mounting portion.

12. The method of claim 11, wherein the traveler is capable of being affixed to an insulator.

13. The method of claim 11, wherein the insulator mounting portion is sized to fit around an insulator clamping surface of an insulator.

14. The method of claim 11, wherein the insulator mounting portion is sized to fit around an insulator clamping surface of an insulator and the insulator mounting portion is flexible and capable of flexing to fit around the insulator clamping surface of the insulator.

15. The method of claim 11, wherein the insulator clamping portion comprises a wing nut, a clamp, a U-bolt or a strap.

16. The method of claim 11, wherein the latch portion is affixed to an upper portion of the left side portion and the right side portion of the body.

17. The method of claim 11, wherein the latch portion is affixed to an upper portion of the left side portion and the right side portion of the body and the latch portion comprises a one-way lever, a nut and bolt, a pin and lever or a pin and roller.

18. The method of claim 11, wherein the insulator clamping portion comprises a wing nut, a clamp, a U-bolt or a strap.

19. The method of claim 11, wherein the slideable saddle surface portion comprises low friction plastic, puck board, a roller or one or more bearings.

* * * * *

UNITED STATES PATENT AND TRADEMARK OFFICE
CERTIFICATE OF CORRECTION

PATENT NO.       : 10,148,076 B2
APPLICATION NO.  : 15/019554
DATED            : December 4, 2018
INVENTOR(S)      : Brian Veary Page 1 of 1

It is certified that error appears in the above-identified patent and that said Letters Patent is hereby corrected as shown below:

On the Title Page

At item (54) and in the Specification at Column 1, Lines 1 and 2:
"HIGH VOLATAGE POWER LINE STRINGING TRAVELER"
Should read:
"HIGH VOLTAGE POWER LINE STRINGING TRAVELER"

Signed and Sealed this
Twenty-ninth Day of January, 2019

Andrei Iancu
*Director of the United States Patent and Trademark Office*